(12) United States Patent
Huang

(10) Patent No.: US 11,671,569 B2
(45) Date of Patent: Jun. 6, 2023

(54) PROJECTION DEVICE

(71) Applicant: Coretronic Corporation, Hsin-Chu (TW)

(72) Inventor: Yu-An Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/475,343

(22) Filed: Sep. 15, 2021

(65) Prior Publication Data

US 2022/0201257 A1 Jun. 23, 2022

(30) Foreign Application Priority Data

Dec. 21, 2020 (CN) .......................... 202011515371.5

(51) Int. Cl.
*H04N 9/31* (2006.01)
*G02B 27/12* (2006.01)
(Continued)

(52) U.S. Cl.
CPC ......... *H04N 9/3114* (2013.01); *G02B 27/126* (2013.01); *G03B 21/2033* (2013.01); *G02B 1/11* (2013.01)

(58) Field of Classification Search
CPC .... G03B 21/005; G03B 21/008; G03B 21/20; G03B 21/28; G03B 21/2013;
(Continued)

(56) References Cited

U.S. PATENT DOCUMENTS 9,448,415 B2 * 9/2016 Liu .................. G03B 21/2073
2004/0189952 A1 9/2004 Kuratomi
(Continued)

FOREIGN PATENT DOCUMENTS

CN 1275070 9/2006
CN 1278163 10/2006
(Continued)

OTHER PUBLICATIONS

"Office Action of Taiwan Counterpart Application", dated Dec. 24, 2021, p. 1-p. 7.
(Continued)

*Primary Examiner* — Sultan Chowdhury
(74) *Attorney, Agent, or Firm* — JCIPRNET

(57) ABSTRACT

The invention provides a projection device including a first display, a second display, a third display, a light-combining module, a first angle selector, a second angle selector, a third angle selector, and a projection lens. The first display, the second display, and the third display are respectively adapted to provide a first image beam, a second image beam, and a third image beam. The projection lens is configured on one side of a light-outgoing surface of the light-combining module, and is adapted to project the first image beam, the second image beam, and the third image beam out of the projection device. The first image beam, the second image beam, and the third image beam respectively pass through the first angle selector, the second angle selector, and the third angle selector, and are then transmitted to the projection lens by the light-combining module.

15 Claims, 3 Drawing Sheets

(51) Int. Cl.
*G03B 21/20* (2006.01)
*G02B 1/11* (2015.01)

(58) Field of Classification Search
CPC ............ G03B 21/2033; G03B 21/2053; G03B 21/2066; G03B 33/04; G03B 33/08; G03B 33/10; G03B 33/12; H04N 9/315; H04N 9/3114; H04N 9/3117; H04N 9/3155

See application file for complete search history.

(56) References Cited

U.S. PATENT DOCUMENTS

| | | | |
|---|---|---|---|
| 2007/0242228 A1* | 10/2007 | Chen .................. | G03B 21/2066 353/20 |
| 2008/0094576 A1* | 4/2008 | Bruzzone ............. | G03B 21/006 359/489.08 |
| 2008/0284920 A1* | 11/2008 | Facius ................. | H04N 9/3164 348/751 |
| 2010/0007860 A1 | 1/2010 | Ueda et al. | |
| 2011/0013179 A1 | 1/2011 | Meijer et al. | |
| 2016/0195236 A1 | 7/2016 | Kita | |
| 2019/0131350 A1 | 5/2019 | Kwak et al. | |
| 2019/0267357 A1 | 8/2019 | Iguchi et al. | |
| 2020/0192204 A1* | 6/2020 | Tarpan ................. | G03B 21/204 |
| 2020/0287103 A1 | 9/2020 | Maegawa et al. | |
| 2021/0373429 A1* | 12/2021 | Zhai ...................... | G03B 21/16 |

FOREIGN PATENT DOCUMENTS

| | | |
|---|---|---|
| CN | 102375236 | 3/2012 |
| CN | 102645829 | 11/2014 |
| CN | 210403049 | 4/2020 |
| CN | 111627956 | 9/2020 |
| EP | 3483933 | 5/2019 |
| JP | 4148161 | 9/2008 |
| KR | 20100081194 | 7/2010 |
| TW | 201243391 | 11/2012 |

OTHER PUBLICATIONS

"Search Report of Europe Counterpart Application", dated Mar. 22, 2022, p. 1-p. 7.
"Search Report of Europe Related Application, Application No. 22153272.4", dated Jun. 23, 2022, p. 1-p. 18.

* cited by examiner

PROJECTION DEVICE

CROSS-REFERENCE TO RELATED APPLICATION

This application claims the priority benefit of China application serial no. 202011515371.5, filed on Dec. 21, 2020. The entirety of the above-mentioned patent application is hereby incorporated by reference herein and made a part of this specification.

BACKGROUND

Technical Field

The invention relates to an optical device, particularly to a projection device.

Description of Related Art

The light source device required by a three-color-combined light projector that uses a light valve system of a digital light processor (DLP) or Liquid Crystal on Silicon (LCoS) has a complex optical system, which results in its huge volume. The advantage of using a three-chip micro-LED display panel with a light-combining system is that the size of the projection device may be reduced.

However, the greatest problem of using the three-chip micro-LED display panel with the light-combining system is the large light-emitting angle of the micro-LED. The method of reducing this angle is to add a reflective cover and to use a micro-LED array (that is, a micro-optical array), but the light-emitting half-angle can only be reduced by 20 degrees (under the condition of a pixel size of less than 5 μm). Moreover, as the light-emitting angle to be reduced is restricted, due to the large light-emitting half-angle and the total reflection inside the light-combining system (light greater than the effective light angle is only totally reflected inside the light-combining module), ineffective light is therefore introduced into the projection lens, leaving stray light appearing on the projected image, which affects the contrast of the projected image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection device capable of effectively reducing stray light from transmitting out of the projection device through a light-combining module, and increasing the contrast of the projected image.

An embodiment of the present invention provides a projection device, which includes a first display, a second display, a third display, a light-combining module, a first angle selector, a second angle selector, a third angle selector, and a projection lens. The first display, the second display, and the third display are respectively adapted to provide a first image beam, a second image beam, and a third image beam. The light-combining module has a first light-incident surface, a second light-incident surface, a third light-incident surface, and a light-outgoing surface. The first angle selector is configured between the first display and the light-combining module. The second angle selector is configured between the second display and the light-combining module. The third angle selector is configured between the third display and the light-combining module. The projection lens is configured on one side of the light-outgoing surface of the light-combining module, and is adapted to project the first image beam, the second image beam, and the third image beam out of the projection device. The first image beam, the second image beam, and the third image beam respectively pass through the first angle selector, the second angle selector, and the third angle selector, and are then transmitted to the projection lens by the light-combining module.

Based on the above, in an embodiment of the present invention, since the projection device is provided with the first angle selector, the second angle selector, and the third angle selector, stray light of the projection device may be reduced effectively, so that the projected image has higher contrast.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
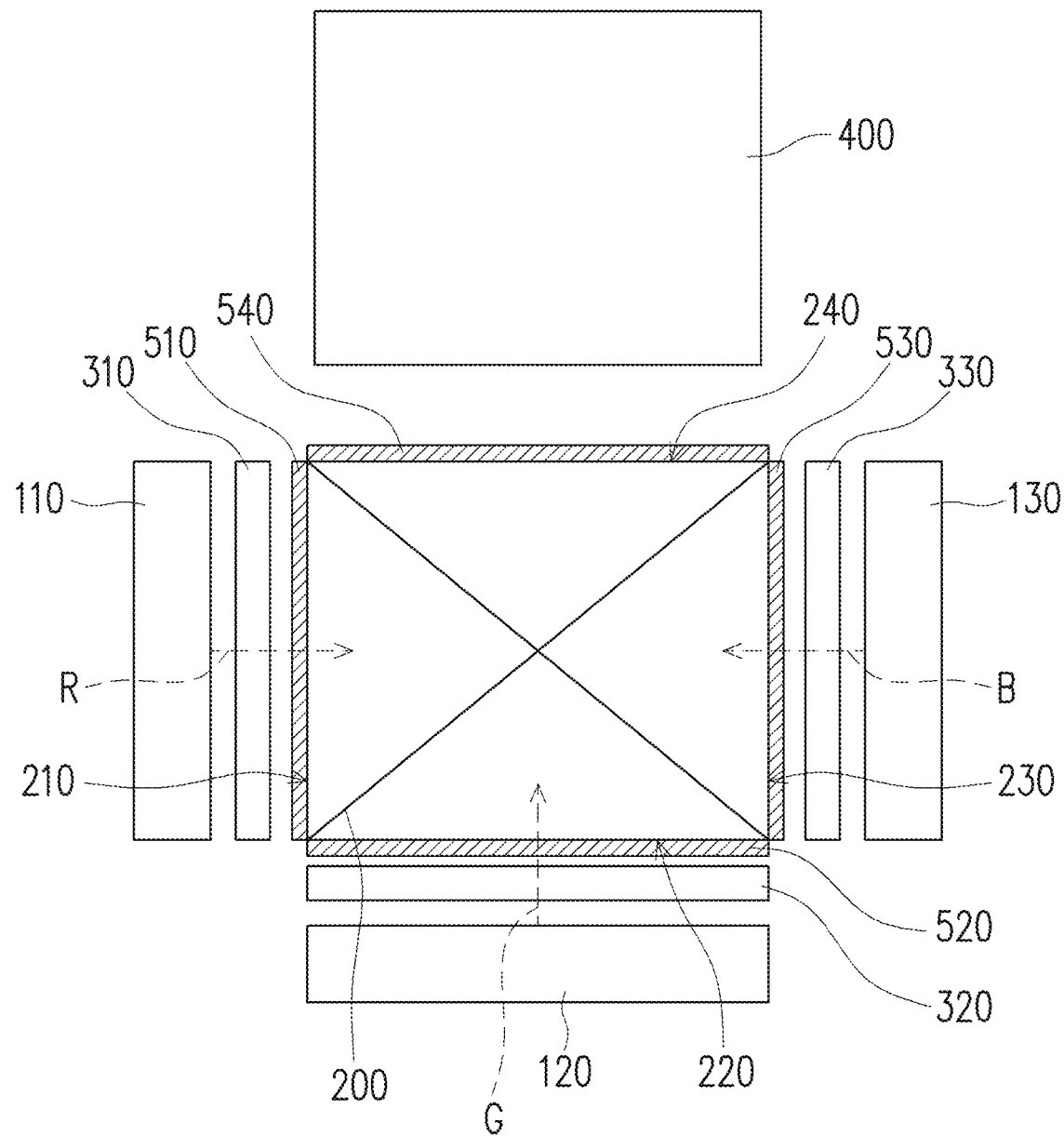
FIG. 1 is a schematic diagram of a projection device according to an embodiment of the present invention.

FIG. 1 is a schematic diagram of a projection device according to an embodiment of the present invention. In FIG. 1, an embodiment of the present invention provides a projection device 10, including a first display 110, a second display 120, a third display 130, a light-combining module 200, a first angle selector 310, a second angle selector 320, a third angle selector 330, and a projection lens 400.

In this embodiment, the first display 110, the second display 120, and the third display 130 may be a liquid crystal display panel, a LED display panel, a mini LED display panel, or a micro-LED display panel, but the present invention is not limited thereto.

In this embodiment, the light-combining module 200 is, for example, a light-combining prism (X-Cube) formed by bonding four prisms, and the refractive index of the bonding agent is preferably the same as that of the prisms, but the manufacturing method described above is not limited to the manufacturing method of the light-combining module 200. In the above configuration, every two adjacent prism surfaces may be provided with an optical film (for example, provide the film by coating), so that the beam with a specific wavelength in the image beam that is transmitted to the prism surface is reflected, whereas the image beams in the rest of the wavelength ranges pass through the prism surface.

In this embodiment, the first angle selector 310, the second angle selector 320, and the third angle selector 330 may be optical films formed by stacking high and low refractive indexes.

In this embodiment, the projection lens 400 includes, for example, a combination of one or more optical lenses with diopter. Optical lenses include various combinations of non-planar lenses, such as biconcave lenses, biconvex lenses, meniscus lenses, convex-concave lenses, plano-convex lenses, and plano-concave lenses. The present invention does not limit the form and type of the projection lens 400.

Specifically, the first display 110, the second display 120, and the third display 130 of this embodiment are adapted to provide a first image beam R, a second image beam G, and a third image beam B, respectively. The first image beam R is, for example, a red light image beam; the second image beam G is, for example, a green light image beam; and the third image beam B is, for example, a blue light image beam. However, the invention is not limited thereto.

In this embodiment, the light-combining module 200 has a first light-incident surface 210, a second light-incident surface 220, a third light-incident surface 230, and a light-outgoing surface 240. The first light-incident surface 210 is opposite to the third light-incident surface 230, the second light-incident surface 220 is opposite to the light-outgoing surface 240, and the second light-incident surface 220 is connected between the first light-incident surface 210 and the third light-incident surface 230. The first angle selector 310 is disposed between the first display 110 and the light-combining module 200. The second angle selector 320 is disposed between the second display 120 and the light-combining module 200. The third angle selector 330 is disposed between the third display 130 and the light-combining module 200. The first angle selector 310, the second angle selector 320, and the third angle selector 330 are respectively disposed on one side of the first light-incident surface 210, the second light-incident surface 220, and the third light-incident surface 230 of the light-combining module 200.

In this embodiment, the first image beam R, the second image beam G, and the third image beam B respectively pass through the first angle selector 310, the second angle selector 320, and the third angle selector 330, and then are transmitted to the projection lens 400 as light combined by the light-combining module 200. The projection lens 400 is disposed on one side of the light-outgoing surface 240 of the light-combining module 200 and is adapted to project the first image beam R, the second image beam G, and the third image beam B out of the projection device 10. The first image beam R is reflected to the projection lens 400 by the optical film of the light-combining module 200 that has the function of reflecting the red-light waveband, the second image beam G passes through the light-combining module 200 and transmits to the projection lens 400, and the third image beam B is reflected to the projection lens 400 by the optical film of the light-combining module 200 that has the function of reflecting the blue-light waveband. The two optical films above are configured in X-type.

In this embodiment, the first angle selector 310 is a filter (band pass filter), such as a red-light wavelength filter. For example, when light is incident perpendicularly to the first angle selector 310, the light of a wavelength falling within the range of 610 to 650 nm is transmitted to pass through it whereas the light of the rest of the wavelengths is reflected. Moreover, the first angle selector 310 transmits light whose incident angle is less than 30 degrees (<30°) to pass through it and reflects light whose incident angle is 30 degrees or more (≥30°).

In this embodiment, the second angle selector 320 is a filter, such as a green-light wavelength filter. For example, when light is incident perpendicularly to the second angle selector 320, the light of a wavelength falling within the range of 510 to 550 nm is transmitted to pass through it and the light of the rest of the wavelengths is reflected. Moreover, the second angle selector 320 transmits light whose incident angle is less than 30 degrees (<30°) to pass through it and reflects light whose incident angle is 30 degrees or more (≥30°).

In this embodiment, the third angle selector 330 is a filter, such as a blue-light wavelength filter. For example, when light is incident perpendicularly to the third angle selector 330, the light of a wavelength falling within the range of 400 to 465 nm is transmitted to pass through it and the light of the rest of the wavelengths is reflected, or, for example, the light whose wavelength is less than or equal to 465 nm is transmitted to pass through it and the light of the rest of the wavelengths is reflected. Moreover, the third angle selector 330 transmits light whose incident angle is less than 30 degrees (<30°) to pass through it and reflects light whose incident angle is 30 degrees or more (≥30°).

In this embodiment, the projection device 10 further includes a first anti-reflection layer 510, a second anti-reflection layer 520, and a third anti-reflection layer 530. The first anti-reflection layer 510, the second anti-reflection layer 520, and the third anti-reflection layer 530 are respectively disposed on the first light-incident surface 210, the second light-incident surface 220, and the third light-incident surface 230.

In this embodiment, the projection device 10 further includes a fourth anti-reflection layer 540, and the fourth anti-reflection layer 540 is disposed on the light-outgoing surface 240. Since the projection device 10 is provided with the first anti-reflection layer 510, the second anti-reflection layer 520, the third anti-reflection layer 530, and the fourth anti-reflection layer 540, the light-outgoing efficiency of the projection device 10 of the embodiment of the present invention is improved effectively.

Figure 2:
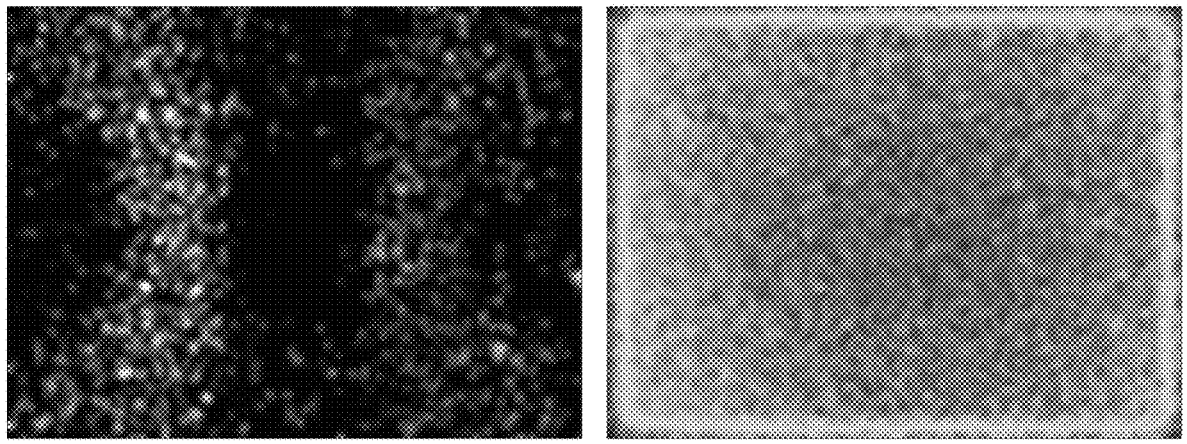
FIG. 2 is a schematic diagram of stray light in a projected image of a projection device provided with a third angle selector according to an embodiment of the present invention.

FIG. 2 is a schematic diagram of stray light in a projected image of a projection device provided with a third angle selector according to an embodiment of the present invention. In FIG. 2, the left image shows the stray light formed at the light-outgoing surface of the light-combining module 200, and the right image shows the stray light formed by the light emerging from the projection lens 400. In FIG. 2, in the effective projected image, the stray light is reduced by 66%, and the stray light outside the effective projected image is only about 55%.

Based on the above, in an embodiment of the present invention, since the projection device 10 is provided with: the first angle selector 310 located between the first display 110 and the light-combining module 200, the second angle selector 320 located between the second display 120 and the light-combining module 200, and the third angle selector 330 located between the third display 130 and the light-combining module 200, thus large-angle image light that is more likely to have total internal reflection in the light-combining module 200 is reflected by the first angle selector 310, the second angle selector 320, and the third angle selector 330 and does not enter the light-combining module 200. As the incident angle of the image beam incident to the light-combining module 200 is restricted effectively, the stray light of the projection device 10 is reduced, thereby improving the contrast of the projected image.

Figure 3:
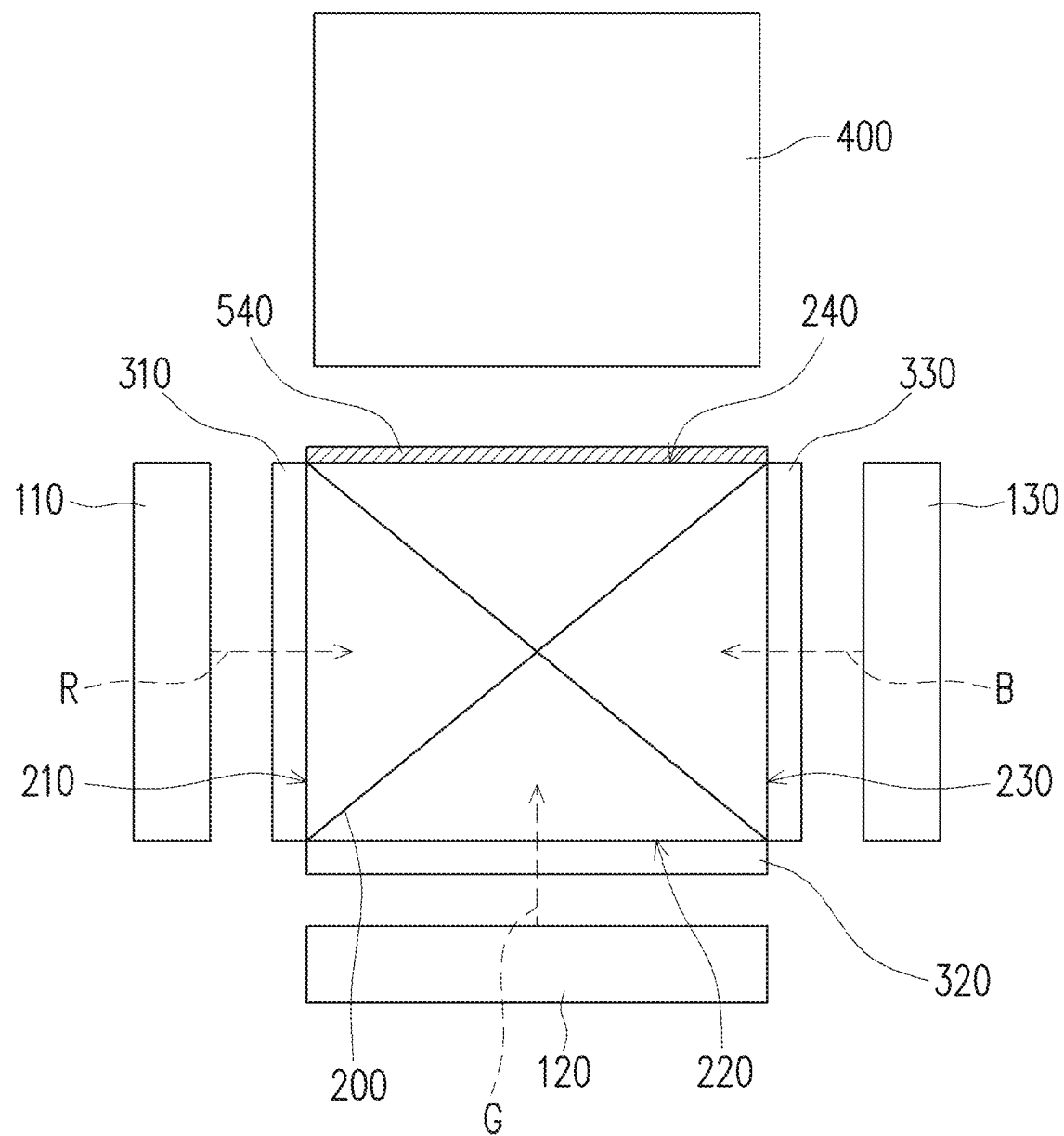
FIG. 3 is a schematic diagram of a projection device according to another embodiment of the present invention.

FIG. 3 is a schematic diagram of a projection device according to another embodiment of the present invention. In FIG. 3, the projection device 10' of FIG. 3 is similar to the projection device 10 of FIG. 1, and their main differences are that: in the projection device 10' of FIG. 3, a first angle selector 310, a second angle selector 320, and a third angle selector 330 are respectively (and directly) configured on a first light-incident surface 210, a second light-incident surface 220, and a third light-incident surface 230, and therefore, the overall volume of the projection device 10' is reduced. A light-outgoing surface 240 of a light-combining module 200 of the projection device 10' has a fourth anti-reflection layer 540, so that the light-outgoing efficiency of the projection device 10' of the embodiment of the present invention is improved effectively.

In summary, in an embodiment of the present invention, since the projection device is provided with a first angle selector located between the first display and the light-combining module, a second angle selector located between the second display and the light-combining module, and a third angle selector located between the third display and the light-combining module, the stray light of the projection device is reduced effectively, and the contrast of the projected image is higher.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be adapted to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising a first display, a second display, a third display, a light-combining module, a first angle selector, a second angle selector, a third angle selector, and a projection lens, wherein:
   the first display, the second display, and the third display are respectively adapted to provide a first image beam, a second image beam, and a third image beam;
   the light-combining module comprises a first light-incident surface, a second light-incident surface, a third light-incident surface, and a light-outgoing surface;
   the first angle selector is configured between the first display and the light-combining module, the second angle selector is configured between the second display and the light-combining module, and the third angle selector is configured between the third display and the light-combining module; and
   the projection lens is configured on one side of the light-outgoing surface of the light-combining module, and the projection lens is adapted to project the first image beam, the second image beam, and the third image beam out of the projection device, wherein:
   after the first image beam, the second image beam, and the third image beam are adapted to pass through the first angle selector, the second angle selector, and the third angle selector respectively, the first image beam, the second image beam, and the third image beam are then adapted to transmit to the projection lens by the light-combining module, wherein the first angle selector is a red-light wavelength filter, and the first angle selector allows the first image beam having an incident angle of less than 30 degrees to pass through, and reflects the first image beam having an incident angle of 30 degrees or more.

2. The projection device according to claim 1, wherein the first light-incident surface is opposite to the third light-incident surface, the second light-incident surface is opposite to the light-outgoing surface, and the second light-incident surface is connected between the first light-incident surface and the third light-incident surface.

3. The projection device according to claim 1, wherein the second angle selector is a green-light wavelength filter, and the second angle selector allows the second image beam having an incident angle of less than 30 degrees to pass through, and reflects the second image beam having an incident angle of 30 degrees or more.

4. The projection device according to claim 1, wherein: the third angle selector is a blue-light wavelength filter, and the third angle selector allows the third image beam having an incident angle of less than 30 degrees to pass through, and reflects the third image beam having an incident angle of 30 degrees or more.

5. The projection device according to claim 1, further comprising a first anti-reflection layer, a second anti-reflection layer, and a third anti-reflection layer, wherein the first anti-reflection layer, the second anti-reflection layer, and the third anti-reflection layer are respectively disposed on the first light-incident surface, the second light-incident surface, and the third light-incident surface.

6. The projection device according to claim 1, wherein the first angle selector, the second angle selector, and the third angle selector are respectively disposed on the first light-incident surface, the second light-incident surface, and the third light-incident surface.

7. The projection device according to claim 1, wherein the light-combining module reflects the first image beam to the projection lens, allows the second image beam to pass through and be transmitted to the projection lens, and reflects the third image beam to the projection lens.

8. The projection device according to claim 1, further comprising a fourth anti-reflection layer, wherein the fourth anti-reflection layer is disposed on the light-outgoing surface of the light-combining module.

9. The projection device according to claim 1, wherein the light-combining module is a light-combining prism.

10. The projection device according to claim 1, wherein the first display, the second display, and the third display are micro-light-emitting-diode display panels.

11. A projection device, comprising a first display, a second display, a third display, a light-combining module, a first angle selector, a second angle selector, a third angle selector, and a projection lens, wherein:
the first display, the second display, and the third display are respectively adapted to provide a first image beam, a second image beam, and a third image beam;
the light-combining module comprises a first light-incident surface, a second light-incident surface, a third light-incident surface, and a light-outgoing surface;
the first angle selector is configured between the first display and the light-combining module, the second angle selector is configured between the second display and the light-combining module, and the third angle selector is configured between the third display and the light-combining module; and
the projection lens is configured on one side of the light-outgoing surface of the light-combining module, and the projection lens is adapted to project the first image beam, the second image beam, and the third image beam out of the projection device, wherein:
after the first image beam, the second image beam, and the third image beam are adapted to pass through the first angle selector, the second angle selector, and the third angle selector respectively, the first image beam, the second image beam, and the third image beam are then adapted to transmit to the projection lens by the light-combining module,
wherein the second angle selector is a green-light wavelength filter, and the second angle selector allows the second image beam having an incident angle of less than 30 degrees to pass through, and reflects the second image beam having an incident angle of 30 degrees or more.

12. A projection device, comprising a first display, a second display, a third display, a light-combining module, a first angle selector, a second angle selector, a third angle selector, and a projection lens, wherein:
the first display, the second display, and the third display are respectively adapted to provide a first image beam, a second image beam, and a third image beam;
the light-combining module comprises a first light-incident surface, a second light-incident surface, a third light-incident surface, and a light-outgoing surface;
the first angle selector is configured between the first display and the light-combining module, the second angle selector is configured between the second display and the light-combining module, and the third angle selector is configured between the third display and the light-combining module; and
the projection lens is configured on one side of the light-outgoing surface of the light-combining module, and the projection lens is adapted to project the first image beam, the second image beam, and the third image beam out of the projection device, wherein:
after the first image beam, the second image beam, and the third image beam are adapted to pass through the first angle selector, the second angle selector, and the third angle selector respectively, the first image beam, the second image beam, and the third image beam are then adapted to transmit to the projection lens by the light-combining module,
wherein: the third angle selector is a blue-light wavelength filter, and the third angle selector allows the third image beam having an incident angle of less than 30 degrees to pass through, and reflects the third image beam having an incident angle of 30 degrees or more.

13. A projection device, comprising a first display, a second display, a third display, a light-combining module, a first angle selector, a second angle selector, a third angle selector, and a projection lens, wherein:
the first display, the second display, and the third display are respectively adapted to provide a first image beam, a second image beam, and a third image beam;
the light-combining module comprises a first light-incident surface, a second light-incident surface, a third light-incident surface, and a light-outgoing surface;
the first angle selector is configured between the first display and the light-combining module, the second angle selector is configured between the second display and the light-combining module, and the third angle selector is configured between the third display and the light-combining module; and the projection lens is configured on one side of the light-outgoing surface of the light-combining module, and the projection lens is adapted to project the first image beam, the second image beam, and the third image beam out of the projection device, wherein:

after the first image beam, the second image beam, and the third image beam are adapted to pass through the first angle selector, the second angle selector, and the third angle selector respectively, the first image beam, the second image beam, and the third image beam are then adapted to transmit to the projection lens by the light-combining module, the projection device further comprises a first anti-reflection layer, a second anti-reflection layer, and a third anti-reflection layer, wherein the first anti-reflection layer, the second anti-reflection layer, and the third anti-reflection layer are respectively disposed on the first light-incident surface, the second light-incident surface, and the third light-incident surface.

14. A projection device, comprising a first display, a second display, a third display, a light-combining module, a first angle selector, a second angle selector, a third angle selector, and a projection lens, wherein:

the first display, the second display, and the third display are respectively adapted to provide a first image beam, a second image beam, and a third image beam;

the light-combining module comprises a first light-incident surface, a second light-incident surface, a third light-incident surface, and a light-outgoing surface;

the first angle selector is configured between the first display and the light-combining module, the second angle selector is configured between the second display and the light-combining module, and the third angle selector is configured between the third display and the light-combining module; and the projection lens is configured on one side of the light-outgoing surface of the light-combining module, and the projection lens is adapted to project the first image beam, the second image beam, and the third image beam out of the projection device, wherein:

after the first image beam, the second image beam, and the third image beam are adapted to pass through the first angle selector, the second angle selector, and the third angle selector respectively, the first image beam, the second image beam, and the third image beam are then adapted to transmit to the projection lens by the light-combining module, wherein the first angle selector, the second angle selector, and the third angle selector are respectively disposed on the first light-incident surface, the second light-incident surface, and the third light-incident surface.

15. A projection device, comprising a first display, a second display, a third display, a light-combining module, a first angle selector, a second angle selector, a third angle selector, and a projection lens, wherein:

the first display, the second display, and the third display are respectively adapted to provide a first image beam, a second image beam, and a third image beam;

the light-combining module comprises a first light-incident surface, a second light-incident surface, a third light-incident surface, and a light-outgoing surface;

the first angle selector is configured between the first display and the light-combining module, the second angle selector is configured between the second display and the light-combining module, and the third angle selector is configured between the third display and the light-combining module; and the projection lens is configured on one side of the light-outgoing surface of the light-combining module, and the projection lens is adapted to project the first image beam, the second image beam, and the third image beam out of the projection device, wherein:

after the first image beam, the second image beam, and the third image beam are adapted to pass through the first angle selector, the second angle selector, and the third angle selector respectively, the first image beam, the second image beam, and the third image beam are then adapted to transmit to the projection lens by the light-combining module, the projection device further comprises a fourth anti-reflection layer, wherein the fourth anti-reflection layer is disposed on the light-outgoing surface of the light-combining module.

* * * * *